US007682560B2

(12) United States Patent
Brash

(10) Patent No.: US 7,682,560 B2
(45) Date of Patent: Mar. 23, 2010

(54) FUMIGATION APPARATUS

(75) Inventor: Kenneth George Brash, Wombarra (AU)

(73) Assignee: Asiaworld Shipping Services Pty (AU)

( * ) Notice: Subject to any disclaimer, the term of this patent is extended or adjusted under 35 U.S.C. 154(b) by 1879 days.

(21) Appl. No.: 10/332,602

(22) PCT Filed: Jul. 12, 2001

(86) PCT No.: PCT/AU01/00839

§ 371 (c)(1),
(2), (4) Date: Jan. 10, 2003

(87) PCT Pub. No.: WO02/03797

PCT Pub. Date: Jan. 17, 2002

(65) Prior Publication Data

US 2003/0118474 A1 Jun. 26, 2003

(30) Foreign Application Priority Data

Jul. 12, 2000 (AU) .................................. PR4019

(51) Int. Cl.
| | |
|---|---|
| *A61L 9/00* | (2006.01) |
| *B01J 19/00* | (2006.01) |
| *A62B 7/08* | (2006.01) |
| *A61L 2/00* | (2006.01) |
| *A01M 19/00* | (2006.01) |
| *A01M 7/00* | (2006.01) |
| *B05B 1/24* | (2006.01) |

(52) U.S. Cl. .................... 422/28; 422/1; 422/5; 422/29; 422/30; 422/32; 422/34; 422/36; 422/37; 422/40; 422/123; 422/124; 422/125; 422/261; 422/292; 422/298; 422/300; 422/305; 422/306; 422/307; 43/125; 43/129; 43/900; 239/135

(58) Field of Classification Search ...................... 422/1, 422/5, 28–30, 32, 34, 36–37, 40, 123–125, 422/261, 292, 298, 300, 305–307; 43/125, 43/129, 900; 239/135

See application file for complete search history.

(56) References Cited

U.S. PATENT DOCUMENTS 2,758,412 A 8/1956 Loibl, Jr.
(Continued)

FOREIGN PATENT DOCUMENTS

DE 4417942 A 11/1995
(Continued)

OTHER PUBLICATIONS

English Translation of JP 10-136862.*

*Primary Examiner*—Jill Warden
*Assistant Examiner*—Monzer R Chorbaji
(74) *Attorney, Agent, or Firm*—Seyfarth Shaw LLP

(57) ABSTRACT

As shown in FIG. 1 there is one embodiment of a fumigation apparatus in the form of a module (8) including a panel (10) which can be positioned in or at an opening of an enclosed space in use to define a fumigation chamber. Fumigant inlet means in the form of an orifice (12) are arranged in the panel (10) to allow a flow of a fumigant directly into the fumigation chamber. A nominal number of mixing fans, in this case two fans (16) and (18), thoroughly circulate gases within the fumigation chamber when operating. The module (8) includes a system control box (14) linked to the fumigant delivery orifice (12) and valve system which functions to control the flow of toxic gas into the fumigation chamber. The panel (10), when positioned in use, is secure against the passage of fumigant and gases by means of an inflatable rubber seal (22) which is located around a lip edge perimeter of the panel (10). Extraction means for evacuation of the fumigation chamber gases includes a pipe (28) attached to an orifice (30) located in the lower region of the panel (10), the pipe (28) in turn connected to a contra-rotating fan (34) and an actuated butterfly valve (32) and thence to a pipe exhaust stack (36). Absorption means are operatively coupled to the extraction means on the module (8) to absorb at least part of the fumigant extracted from the fumigation chamber. The absorption means is in the form of a removable absorption bed cartridge (40) and includes activated carbon to which the fumigant attaches or is absorbed and is thus stripped from the gas/fumigant extracted from the fumigation chamber.

22 Claims, 1 Drawing Sheet

U.S. PATENT DOCUMENTS

| | | | |
|---|---|---|---|
| 2,937,419 A | | 5/1960 | Vaughn |
| 2,981,464 A | * | 4/1961 | Omohundro ............... 415/68 |
| 3,041,684 A | * | 7/1962 | Dawson et al. ............ 422/292 |
| 4,966,755 A | * | 10/1990 | Smith ....................... 422/28 |
| 5,505,908 A | * | 4/1996 | Nagji ....................... 422/31 |
| 5,904,909 A | | 5/1999 | Yates et al. |
| 6,279,261 B1 | * | 8/2001 | Binker et al. ............... 43/125 |

FOREIGN PATENT DOCUMENTS

| | | | |
|---|---|---|---|
| GB | 459 721 A | | 1/1937 |
| JP | 02-303442 | * | 12/1990 |
| JP | 02-303442 A | | 12/1990 |
| JP | 10-136862 | * | 5/1998 |
| JP | 10-136862 A | | 5/1998 |

\* cited by examiner

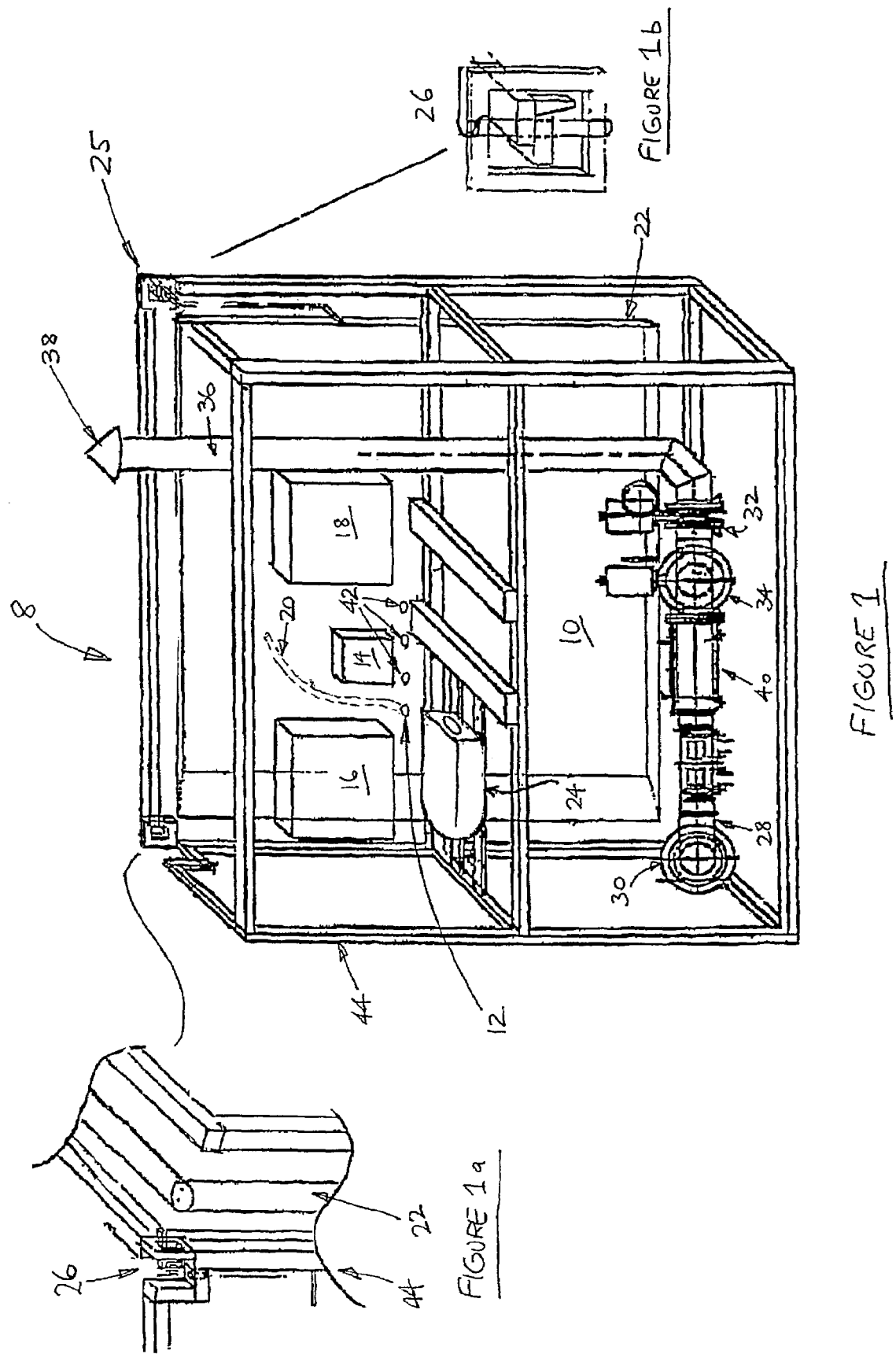

FUMIGATION APPARATUS

CROSS REFERENCE TO RELATED APPLICATION

This application claims the priority of Australian patent application serial No. PR 4019, filed on Jul. 12, 2000.

FIELD OF THE INVENTION

The present invention relates generally to a fumigation apparatus. The invention will primarily be described with reference to its use to provide fumigation of grains and other agricultural products, but it should be realised that the invention can have broader applications to any other bulk materials, goods or produce which may contain pests or insects or other vermin and which therefore require fumigation.

BACKGROUND TO THE INVENTION

Many crops, grains and other agricultural products contain pests, parasites, insects or other vermin, such as for example borers, lice, ticks, fleas or termites. It is best to treat such bulk materials in situ so that multiple handling in a further treatment process is not required and before the goods leave their geographic region of origin to prevent the spread of insects and vermin.

Fumigation devices for bulk materials are known in the art that involve placement of a heavy, impervious blanket or other covering article over the materials followed by subsequent addition of toxic gas flow under the blanket to fumigate the covered goods. Current methods of fumigation under blankets are crude, ineffective at fully eliminating insect infestation since no mixing of gases with bulk materials can occur, and highly dangerous from an occupational health standpoint since the gases used for effective fumigation are extremely toxic. Atmospheric discharges of fumigant gases such as methyl bromide are highly undesirable also because this gas is an ozone depleting substance.

In JP2303442 a fumigation system is described which teaches venting the gaseous fumigant (or incinerating and then venting to atmosphere the gaseous products of the soincinerated fumigant) once it has been exhausted or extracted from a fumigation chamber. This document teaches that a preferred way to deal with fumigant or fumigant by-products is by venting to atmosphere, whether by fan extractor located on the fumigation container or coupled to such a device on an adjacent mobile vehicle. Once again such atmospheric discharges are undesirable from a pollution and occupational health standpoint.

SUMMARY OF THE INVENTION

According to one aspect of the present invention there is provided a fumigation apparatus for fumigation of a fumigation chamber adapted to contain produce, the apparatus including:

a module which is adapted to be removably positioned in or at an opening of the fumigation chamber;

fumigant inlet means operatively coupled to the module to allow a flow of a fumigant into the fumigation chamber;

extraction means also being operatively coupled to the module to remove a majority of the fumigant from the fumigation chamber; and absorption means operatively coupled to the extraction means, the absorption means being designed to absorb substantially all of the fumigant extracted from the fumigation chamber.

Advantageously the present fumigation chamber venting system permits fumigant to be absorbed during the extraction step without allowing fumigant or fumigant by-products to escape to atmosphere.

Preferably a control means is operatively coupled to the module and arranged to control the flow of fumigant into the fumigation chamber.

Preferably the absorption means comprises an absorption bed including activated carbon to which at least part of the extracted fumigant attaches.

Preferably the module is adapted to be attached to a source of the fumigant which is directly associated with a heating source, the latter used to convert the fumigant into a gaseous form. The heat energy transferred to the fumigant should be such that it becomes more buoyant than ambient air.

Preferably the fumigant inlet means is adapted to detachably couple to a mobile source of the fumigant such as a motor vehicle on which a fumigant vessel is mounted.

Preferably the control means includes a system control box and a system of fumigant delivery pipes and valves adapted in use to supply fumigant from a supply source to the fumigation chamber.

Preferably the fumigant inlet means includes a dispersion pipe system in use located above the contents of the fumigation chamber. Such an arrangement allows the fumigant, which is generally heavier than air, to fall in a dispersed fashion downward over the top of the produce which has been loaded into the fumigation chamber.

Preferably the module when positioned in use is secure against the passage of fumigant and is fitted with external locking cam devices adapted to be secured, for example with a spring loaded clip arrangement.

Preferably the module when positioned in use is secure against the passage of fumigant and gases by an inflatable seal which can be inflated for example by means of a compressor fitted to the module. This means that toxic gases from the process in the fumigation chamber will not pose any occupational health risk to operators of the fumigation apparatus during processing, while they may be standing alongside the panel.

Preferably the module is provided with a plurality of mixing fans adapted to circulate fumigant and gases within the fumigation chamber. Such an arrangement allows more even and thorough dispersion of the fumigant and gases as they enter and are dispersed in the fumigation chamber.

Preferably the extraction means includes a pipe attached to an orifice located in a lower region of the module, the pipe being connected in turn to an actuated butterfly valve further connected in turn to a contra-rotating fan adapted to provide suction for the extraction of the fumigant. More preferably the extraction means includes an exhaust stack positioned vertically above the module, the uppermost terminal of the exhaust stack being fitted with a gas diffuser and appropriate rain guard, and the exhaust stack being arranged to receive the extracted gases which are stripped of fumigant.

Preferably the module is fitted with a plurality of small diameter pipes independently connected via an appropriate system of taps and connectors to a fumigant sampling and detection meter unit located at the module.

Preferably the module includes a fumigant sampling and detection meter unit and power supply switches for mixing fans, exhaust fan and valve actuators.

In a further preferred embodiment the module is provided in two portions adapted to be operatively coupled together. Preferably a first portion includes the fumigant inlet means and a second portion includes the fumigant extraction and absorption means.

In either of the preferred embodiments of the invention the fumigation apparatus module is constructed as a rectangular panel with a protruding frame on the exterior face so that the panel can stand independently upright. Effective fumigation of produce by skilled operators would allow for the safe treatment of material in situ and may eliminate the possibility of insects or vermin escaping into the environment, or being transported across the country in contaminated produce. This invention can provide a faster fumigation processing rate than the present technology along with enhanced health and safety benefits.

According to a second aspect of the present invention there is provided a method of fumigating produce including the steps of:

providing a fumigation apparatus including a module adapted to removably attach to a fumigation chamber, fumigant inlet, extraction and absorption means being operatively coupled to the module;

locating the produce to be fumigated in the fumigation chamber;

attaching the module in or at an opening of the fumigation chamber;

providing a flow of a fumigant to the fumigation chamber via the fumigant inlet means;

extracting a majority of the fumigant from the chamber via the fumigant extraction means; and absorbing substantially all of the extracted fumigant on the absorption means.

According to a third aspect of the present invention there is provided a method of fumigating produce including the steps of:

providing a fumigation apparatus including a first portion of a module adapted to removably attach to a fumigation chamber, fumigant inlet means being operatively coupled to the first portion;

locating the produce to be fumigated in the fumigation chamber;

attaching the first portion in or at an opening of the fumigation chamber;

providing a flow of a fumigant to the fumigation chamber via the fumigant inlet means;

providing a second portion of the module adapted to removably attach to the first portion, fumigant extraction and absorption means being operatively coupled to the second portion;

extracting a majority of the fumigant from the chamber via the fumigant extraction means; and absorbing substantially all of the extracted fumigant on the absorption means. Preferably the fumigant extracted from the chamber is absorbed on an absorption bed.

Typically in either the second or the third aspect the method of fumigating produce further comprises washing at least part of the absorption bed to remove the absorbed fumigant. More typically the absorption bed is washed with a scrubbing solution, such as sodium thiosulphate, to yield one or more salts, such as bromide and sodium methylthiosulphate.

Generally the fumigant includes an alkyl halide such as methyl bromide.

BRIEF DESCRIPTION OF THE DRAWINGS

Notwithstanding any other forms which may fall within its scope, preferred forms of the invention will now be described, by way of example only, with reference to the accompanying drawings in which:

FIG. 1 shows a perspective schematic view of a fumigation apparatus in accordance with one embodiment of the invention.

FIG. 1a shows a perspective schematic view of a portion of the apparatus shown in FIG. 1.

FIG. 1b shows a perspective schematic view of a portion of the apparatus shown in FIG. 1.

DETAILED DESCRIPTION OF THE PREFERRED EMBODIMENTS

FIG. 1 shows an embodiment of a fumigation apparatus in the form of a module 8 which can be positioned in or at an opening of an enclosed space in use to define a fumigation chamber Typical enclosed spaces can include silos, sheds, warehouses and rooms of any dimension capable of being sealed in a gas tight fashion. A typical opening into the enclosed space could be a doorway, window, inspection port or custom fashioned portal to accommodate the module 8. Typically the opening or portal is of equivalent size to the panel 10 which forms a full side of the module 8. The panel 10 in use then blocks the opening to the enclosed space.

A fumigant inlet means in the form of an orifice 12 is arranged in the panel 10 to allow a flow of a fumigant directly into the fumigation chamber. An external source of gas provides heavy toxic gas molecules, for example methyl bromide, which have been appropriately heated, gasified and dispersed in air for transfer into the fumigation chamber. The heating source is used to convert the fumigant into a gaseous form. The heat energy transferred to the fumigant should be such that it becomes more buoyant than ambient air. The orifice 12 is adapted to be detachably coupled to a mobile source of the fumigant gas such as a motor vehicle on which a fumigant source vessel is mounted with the appropriate heating facilities thereat. The orifice 12 can be fitted with suitable hose couplings or fittings to enable linkage with external sources of gas.

A nominal number of mixing fans, in this case two fans 16, 18, thoroughly circulate gases within the fumigation chamber when operating. The mixing fans 16, 18 are located by appropriate wall mountings on the face of the panel 10 directed toward the interior of the fumigation chamber in use, to provide sufficient circulation to prevent the heavier than air toxic gases from only locating in the lower portion of the fumigation chamber.

The module 8 includes a system control box 14 positioned at the panel 10 and linked to the fumigant delivery orifice 12 and associated valve system. The system control box 14 functions to control the flow of toxic gas into the fumigation chamber. Such an arrangement ensures that at all times the availability of fumigation gases is able to be manually controlled which ensures that highly safe operating procedures can be maintained. A fumigant delivery pipe in the form of a perforated plastic dispersion pipe 20 is shown connected to the orifice 12, pipe 20 being for positioning above the produce in the fumigation chamber. Such an arrangement allows the fumigant, which is generally heavier than air, to fall in a dispersed fashion downward over the top of the produce which has been loaded into the fumigation chamber.

The panel 10 when positioned in use is secured against the passage of fumigant and gases by means of an inflatable rubber seal 22 which is located around a lip edge perimeter of the panel 10. When the panel 10 is positioned in or at the opening to the enclosed space and immediately prior to use, the seal 22 is inflated by means of a compressor 24 fitted to the module 8. This means that toxic gases from the fumigation chamber will not pose any occupational health risk to operators of the fumigation apparatus during processing, while they may be standing alongside the module 8. As shown in FIGS. 1a and 1b, the panel 10 is fitted with external corner locking cam devices 25 which enable the panel 10 to be secured to the adjacent wall, for example by means of a spring loaded clip arrangement 26.

Extraction means for evacuation of the fumigation chamber gases includes a pipe 28 attached to an orifice 30 located in the lower region of the panel 10, the pipe 28 in turn connected to an actuated butterfly valve 32 and a contra-rotating fan 34 and thence to a pipe exhaust stack 36. The uppermost terminal of the stack 36 is fitted with a gas diffuser and appropriate rain guard 38. Control of the actuated butterfly valve 32 and contra-rotating fan 34 are by means of system control box 14. Such an arrangement allows the toxic, heavier than air gases to be removed by fan induced suction from the fumigation chamber at an appropriate lower height, where said gas molecules will naturally congregate without recirculation, followed by dispersion to the external atmosphere via a stack 36 which is, of sufficient height to allow the gas contents of the fumigation chamber to be safely vented without occupational health risk exposure to operators or others located nearby the fumigation apparatus. The extraction fan can be of any suitable type, and not necessarily contra-rotating, for example a centrifugal fan is also suitable.

Absorption means are operatively coupled to the extraction means to absorb the majority of the fumigant extracted from the fumigation chamber. The absorption means is in the form of a removable absorption bed cartridge 40 is located in pipe 28 downstream of the valve 32 and includes activated carbon to which the fumigant (in one example being methyl bromide) is attached or absorbed, and is thus stripped from the gas/fumigant extracted from the fumigation chamber. The use of a plurality of in-line absorption cartridges is within the scope of the invention.

A plurality of flexible plastic gas sampling lines are mounted on the panel 10 at orifices 42 and independently connected via an appropriate system of pipes and connectors to a gas flow meter test unit located within system control box 14. Such an arrangement provides a gas sampling system which draws small amounts of the gaseous contents of the fumigation chamber and delivers a reading on the gas flow meter test unit as to the concentration of toxic gas remaining in the fumigation chamber during the venting procedure. This monitoring is carried out to ensure that the panel 10 may be safely disengaged from the fumigation chamber for the purposes of removing the charged produce without occupational health risk exposure to operators or others located nearby the module 8.

The system control box 14 also includes power supply switches and circuits for operating the mixing fans 16, 18 and, as stated earlier, the actuated butterfly valve 32 and the contra-rotating fan 34. Such an arrangement provides a central and securable location for all electrically operated devices, which is important when sequential operational steps are required.

In the preferred embodiment of the invention the module includes a rectangular panel 10 with a protruding frame 44 on the exterior face so that the panel 10 can stand independently upright when not in position on or at an opening of the space to be enclosed. Other shapes of frames to enable safe placement of the module when disengaged from the enclosed space would be within the scope of the invention, for example a panel having protruding legs or a basal wing on one side, or collapsible support legs which can be outwardly oriented to the panel etc.

During use, produce for fumigation is loaded into the fumigation chamber via the opening or another gas tight doorway to provide access for the load. The module 8 is then moved so that the panel 10 is then sealed into place at the opening and heated toxic gases, generated by warming liquified fumigation reagent by means of a heating source, directly enter the fumigation chamber via the orifice 12 and the pipe 20. The system control box 14 functions to control the flow of toxic gas into the fumigation chamber. The mixing fans 16, 18 circulate gases within the fumigation chamber when in use to provide good mixing of toxic gases with the charged material. When the fumigation interval is complete, the recirculation fans 16, 18 are switched off, the flow of toxic gas into the chamber is stopped and gas is evacuated from the fumigation chamber, flowing consecutively through orifice 30, pipe 28, absorption cartridge 40, contra-rotating fan 34 and actuated butterfly valve 32 before exiting the apparatus via pipe exhaust stack 36. As a safety check of the concentration of toxic gases remaining in the fumigation chamber, gas samples are drawn via a plurality of gas sampling lines connected to orifices 42 in panel 10 to a gas flow meter test unit located within the system control box 14 and a readout is obtained so that the operator may ascertain when it is safe to disengage panel 10 and move the module 8 aside to access the produce after fumigation.

The methyl bromide attaches to the activated carbon of the absorption bed cartridge 40 prior to discharge of the fumigant/gas mixture from the fumigation apparatus. The absorption bed cartridge 40 is periodically washed with a scrubbing solution, such as sodium thiosulphate. In this embodiment, scrubbing of contents of the absorption bed cartridge 40 with sodium thiosulphate yields bromide and sodium methylthiosulphate which are non-toxic salts which can be discharged safely to the environment. Thus, the methyl bromide gas is degraded following its fumigation and then extraction from the fumigation apparatus.

In further embodiments of the invention, the fumigant gas used can be of different types, depending on the fumigation situation. For example, it is within the scope of the invention for gases such as phosphine, sulfural fluoride or carbon dioxide to be used in the fumigation method. In the case of phosphine, passing the gas through an absorption cartridge of wet carbon causes the gas to be converted to form phosphoric salts on the outside surface of the carbon; these salts can be subsequently washed away from the carbon. In the case of sulfural fluoride, passing the gas through an absorption cartridge containing calcium carbonate causes the gas to be converted to form various sulfur salts which again can be safely disposed of. If carbon dioxide is used as a fumigant to suffocate pests etc, it may simply be removed from the fumigation chamber by bubbling into a vessel or cartridge containing water to form carbonic acid, and subsequently discarded.

The present invention teaches the removal of the fumigant gases by extraction from the fumigation chamber followed by chemical absorption of that fumigant so that substantially no fumigant (or fumigant by-product) is expelled to the atmosphere. There are significant environmental and occupational health reasons for this further gas processing so, that a fumigation process such as the one described may be operated safely in the vicinity of people or animals or generally in urban areas. The absorption process described in the present application represents an advancement over the exhaust gas incineration or dilution processes described in the prior art. Fumigation systems such as this which can use fumigation reagents such as methyl bromide safely and in a way in which is non-toxic to the environment are of major interest worldwide.

In a further embodiment of the invention, the module can be supplied in two parts which, when co-joined and connected to the enclosed space to define a fumigation chamber, enable the use of the fumigation method of the invention. In such an embodiment a first part of the module including a panel with fumigant inlet means operatively coupled thereto can be fitted to an enclosed space. Fumigant gas can be introduced into the fumigation chamber and the fumigation process initiated. The mixing fan controls and the gas sampling lines and gas flow meter test unit are located on the first part of the module. After fumigation has concluded, a second part of the module including the extraction means and the absorption means can be joined or clipped onto the first part of the module, in order to facilitate the extraction of the majority of fumigant gas from the fumigation chamber and absorption of substantially all of the fumigant extracted. This second part of the module can include the contra-rotating fan, gas exhaust stack and absorption bed cartridge. The advantage of such a two-part apparatus is that a plurality of adjacent fumigation chambers can be operated at once, with each chamber being fitted with at least a first part of the module, while being able to share one second part of the module, thus reducing the overall cost of construction of the modules of the invention. In one example, several fumigation chambers fitted with a first part of a module could be in various stages of completion of a fumigation operation, and as fumigation finishes in each chamber, the second part of the module can be moved to each fumigation chamber in sequence so that extraction and absorption of fumigant can occur. While this is happening, some of the chambers where the steps of fumigation, extraction and absorption have already taken place can be emptied and reloaded with new produce for fumigation. Such a series operation can provide a more efficient 'continuous' fumigation process while minimising the capital cost of the equipment used.

Now that several preferred embodiments of the present invention have been described in some detail it would be apparent to those skilled in the art that the fumigation apparatus has at least the following advantages over the prior art:

1. The fumigation apparatus is adapted to be positioned on a wall of any enclosed space and thus is relatively convenient and uncomplicated to fabricate;

2. The fumigation apparatus is relatively effective in fumigating produce; and

3. The fumigation apparatus is "environmentally friendly" in its fumigation and discharge of the fumigant.

Effective fumigation of produce by skilled operators would allow for the safe treatment of material in situ and may eliminate the possibility of insects or vermin escaping into the environment, or being transported across the country in contaminated produce. This invention can provide a faster fumigation processing rate than the present technology along with enhanced health, safety and environmental benefits.

Those skilled in the art will appreciate that the invention described herein is susceptible to variations and modifications other than those specifically described. For example, the source of fumigant need not be located on a mobile vehicle such as a utility truck but may rather be mounted onto the exterior of the module itself. The invention need not be restricted to methyl bromide as the fumigant but rather extends to any substance which is suitable in fumigating produce and thus killing pests, parasites, insects, or vermin. The invention need not be restricted to the specific shape or constructional features described and may, for example, not include the exhaust stack.

All such variations and modifications are to be considered within the scope of the present invention the nature of which is to be determined from the foregoing description.

The claims defining the invention are as follows:

1. A fumigation module for fumigation of a fumigation chamber adapted to contain produce, the module comprising:
   a panel which is adapted to be directly mourned and removably positioned in or at an opening of the fumigation chamber;
   fumigant inlet means operatively coupled to the panel to allow a flow of a fumigant into the fumigation chamber;
   extraction means also being operatively coupled to the panel to remove a majority of the fumigant from the fumigation chamber, the extraction means including a pipe attached to an orifice located in a lower region of the panel, the pipe being connected in turn to a valve further connected in turn to a contra-rotating fan adapted to provide suction for the extraction of the fumigant; and
   absorption means operatively coupled to the extraction means; the absorption means being designed to absorb substantially all of the fumigant extracted from the fumigation chamber.

2. A fumigation assembly including the module of claim 1 and a fumigation chamber adapted to contain produce having a rigid support structure.

3. A fumigation module as claimed in claim 1 further comprising control means operatively coupled to the module and arranged to control the flow of fumigant into the fumigation chamber.

4. A fumigation module as claimed in claim 3 wherein the control means includes a system control box and a system of fumigant delivery pipes and valves adapted in use to supply fumigant from a supply source to the fumigation chamber.

5. A fumigation module as claimed in claim 1, wherein the absorption means comprises an absorption bed including activated carbon to which at least part of the extracted fumigant attaches.

6. A fumigation module as claimed in claim 1, wherein the module is adapted to be attached to a source of the fumigant which is directly associated with a heating source, the latter used to convert the fumigant into a gaseous form.

7. A fumigation module as claimed in claim 1, wherein the fumigant inlet means is adapted to detachably couple to a mobile source of the fumigant.

8. A fumigation module as claimed in claim 1, wherein the fumigant inlet means includes a dispersion pipe system in use located above the contents of the fumigation chamber.

9. A fumigation module as claimed in claim 1, wherein the panel when positioned in use is secure against the passage of fumigant and is fitted with external locking cam devices.

10. A fumigation module as claimed in claim 9 wherein the panel when positioned in use is secure against the passage of fumigant and gases by an inflatable seal.

11. A fumigation module as claimed in claim 10 wherein the seal can be inflated by means of a compressor fitted to the module.

12. A fumigation module as claimed in claim 1, wherein the module is provided with a plurality of mixing fans adapted to circulate fumigant and gases within the fumigation chamber.

13. A fumigation module as claimed in claim 1 wherein the extraction means includes an exhaust stack positioned vertically above the module, the uppermost terminal of the exhaust stack being fitted with a gas diffuser and appropriate rain guard, and the exhaust stack being arranged to receive the extracted gases which are stripped of fumigant.

14. A fumigation module as claimed in claim 1, wherein the module is fitted with a plurality of small diameter pipes independently connected via an arrangement of taps and connectors to a fumigant sampling and detection meter unit located at the module.

15. A fumigation module as claimed in claim 1, wherein the module includes a fumigant sampling and detection meter unit and power supply switches for mixing fans, exhaust fan and valve actuators.

16. A fumigation module as claimed in claim 1, wherein the module is provided in two portions adapted to be operatively coupled together.

17. A fumigation module as claimed in claim 16 wherein first portion includes the fumigant inlet means and a second portion includes the fumigant extraction and absorption means.

18. A method of fumigating produce comprising the steps of:
providing a fumigation module which includes a panel, the panel adapted to removably attach to a fumigation chamber, with fumigant inlet, extraction and absorption means being operatively coupled to the panel, the extraction means including a pipe attached to an orifice located in a lower region of the panel, the pipe being connected in turn to an actuated butterfly valve further connected in turn to a contra-rotating fan adapted to provide suction for the extraction of the fumigant;
locating the produce to be fumigated in the fumigation chamber;
directly attaching the panel in or at an opening of the fumigation chamber;
providing a flow of a fumigant to the fumigation chamber via the fumigant inlet means;
extracting a majority of the fumigant from the chamber via the fumigant extraction means and
absorbing substantially all of the extracted fumigant using the absorption means.

19. A method of fumigating produce as claimed in claim 18, wherein the fumigant extracted from the chamber is absorbed on an absorption bed.

20. A method of fumigating produce as claimed in claim 19, further comprising washing at least part of the absorption bed to remove the absorbed fumigant.

21. A method of fumigating produce comprising the steps of:
providing a fumigation apparatus
including a first portion of a module including a panel, the panel adapted to removably attach to a fumigation chamber, with fumigant inlet means being operatively coupled to the panel;
locating the produce to be fumigated in the fumigation chamber;
directly attaching the panel in or at an opening of the fumigation chamber;
providing a flow of a fumigant to the fumigation chamber via the fumigant inlet means;
providing a second portion of the module adapted to removably attach to the panel, with fumigant extraction and absorption means being operatively coupled to the second portion;
extracting a majority of the fumigant from the chamber via the fumigant extraction means, the fumigant extraction means including a pipe attached to an orifice located in a lower region of the panel, the pipe being connected in turn to an actuated butterfly valve further connected in turn to a contra-rotating fan adapted to provide suction for the extraction of the fumigant; and
absorbing substantially all of the extracted fumigant using the absorption means.

22. A method of fumigating produce as claimed in claim 21, wherein the absorption means comprises an absorption bed and the fumigant extracted from the chamber is absorbed on the absorption bed.

* * * * *